(12) United States Patent
Yamaguchi (10) Patent No.: US 11,235,420 B2
(45) Date of Patent: Feb. 1, 2022

(54) LASER WELDING APPARATUS AND MANUFACTURING METHOD OF COMPONENT

(71) Applicant: FUTABA INDUSTRIAL CO., LTD., Okazaki (JP)

(72) Inventor: Koji Yamaguchi, Okazaki (JP)

(73) Assignee: FUTABA INDUSTRIAL CO., LTD., Okazaki (JP)

(*) Notice: Subject to any disclaimer, the term of this patent is extended or adjusted under 35 U.S.C. 154(b) by 307 days.

(21) Appl. No.: 16/123,061

(22) Filed: Sep. 6, 2018

(65) Prior Publication Data

US 2019/0076960 A1 Mar. 14, 2019

(30) Foreign Application Priority Data

Sep. 14, 2017 (JP) .............................. JP2017-176603

(51) Int. Cl.
*B23K 26/06* (2014.01)
*B23K 26/073* (2006.01)
*B23K 26/066* (2014.01)

(52) U.S. Cl.
CPC ........ *B23K 26/0626* (2013.01); *B23K 26/066* (2015.10); *B23K 26/0648* (2013.01); *B23K 26/073* (2013.01)

(58) Field of Classification Search
CPC ............... G02B 27/0927; G02B 27/46; G02B 19/0014; G02B 19/0057; G02B 27/0012; G02B 27/0025; G02B 27/0037; G02B 27/0075; G02B 27/0955; G02B 27/0972; G02B 27/0994; G02B 27/48; G02B 27/58;
(Continued)

(56) References Cited

U.S. PATENT DOCUMENTS 5,502,001 A * 3/1996 Okamoto ........... G01B 11/0608
438/798
5,767,479 A 6/1998 Kanaoka
(Continued)

FOREIGN PATENT DOCUMENTS

CN 100398329 C 7/2008
CN 102230983 A 11/2011
(Continued)

OTHER PUBLICATIONS

Office Action for Canadian Patent Application No. 3,017,005, dated Jun. 17, 2019, 3 pages.
(Continued)

*Primary Examiner* — Tu B Hoang
*Assistant Examiner* — Vy T Nguyen
(74) *Attorney, Agent, or Firm* — Withrow & Terranova, P.L.L.C.; Vincent K. Gustafson (57) ABSTRACT

A radiator in a laser welding apparatus radiates a beam to a main region and an auxiliary region on a welding surface. The auxiliary region is positioned to be adjacent to the main region or to be apart from the main region. A welding direction is a direction in which a beam radiation region moves during laser welding. The auxiliary region includes at least an area positioned on a forward side of the main region in the welding direction. The radiator radiates the beam in a setting such that at least one peak occurs in each of the main region and the auxiliary region.

16 Claims, 5 Drawing Sheets

(58) Field of Classification Search
CPC .... G02B 5/3083; G02B 6/02; G02B 6/02004;
G02B 6/02042; G02B 6/021; G02B
6/023; G02B 6/02347; G02B 6/02371;
G02B 6/02395; G02B 6/0281; G02B
6/03694; G02B 6/3633; G02B 6/03638;
G02B 6/0365; G02B 6/03688; G02B
6/14; G02B 6/255; G02B 6/262; G02B
6/34; G02B 6/4203; G02B 6/4206; G02B
6/4296; G02B 7/028; G02B 6/03627;
G02B 6/03616; G02B 6/03611; G02B
6/036; G02B 6/0288; G02B 27/44; G02B
27/4277; G02B 27/425; G02B 27/4233;
G02B 27/095; G02B 27/0944; G02B
27/0983; G02B 27/0933; G02B 26/101;
G02B 2207/117; G02B 2006/12121;
G02B 5/1871; G02B 27/09; G02B
27/0988; B23K 26/06; B23K 26/064;
B23K 26/38; B23K 2103/50; B23K
2103/54; B23K 26/073; B23K 26/082;
B23K 2101/40; B23K 2103/16; B23K
2103/166; B23K 2103/42; B23K 2103/52;
B23K 2103/56; B23K 26/0006; B23K
26/032; B23K 26/034; B23K 26/0342;
B23K 26/04; B23K 26/046; B23K
26/062; B23K 26/0622; B23K 26/0624;
B23K 26/0643; B23K 26/066; B23K
26/0665; B23K 26/067; B23K 26/0676;
B23K 26/0732; B23K 26/0738; B23K
26/706; B23K 26/704; B23K 26/53;
B23K 26/402; B23K 26/382; B23K
26/342; B23K 26/242; B23K 26/21;
B23K 26/16; B23K 26/0892; B23K
26/0884; B23K 26/0869; B23K 26/0853;
C03B 33/0222; C03B 33/033; C03B
33/04; C03B 33/07; C03B 33/102; H01L
21/268; H01L 21/0237; H01L 21/0268;
H01L 27/1266; H01L 27/1285; H01S
2301/206; H01S 5/005; H01S 5/4012;
H01S 3/005; H01S 3/0805; H01S
3/08068; H01S 3/10076; H01S 5/0085;
H01S 5/14; H01S 5/4025; H01S 5/423;
B22F 10/00; B22F 10/10; B22F 3/1109;
B22F 3/24; B29C 48/08; B29C 64/153;
B29C 64/264; B33Y 10/00; B33Y 30/00;
B33Y 50/02; G02F 1/0115; G02F 1/0151;
G02F 1/21; G02F 1/37; G02F 1/372;
G03B 21/2013; G03B 21/2033; G03B
21/208; G11B 2005/0005; G11B
2005/0021; G11B 5/1278; G11B 5/314;
G11B 5/4866
USPC .......... 219/121.73, 121.6, 121.61, 121.62,
219/121.63, 121.64, 121.65, 121.66,
219/121.83; 359/238, 240, 559, 569, 618,
359/641, 720; 65/112, 355; 372/101,
372/102, 103, 108, 23, 29.023, 64, 9, 95,
372/98, 99; 385/122, 129, 37; 438/530,
438/795, 798
See application file for complete search history.

(56) References Cited

U.S. PATENT DOCUMENTS

| | | |
|---|---|---|
| 5,889,253 A | 3/1999 | Kanaoka |
| 6,016,223 A * | 1/2000 | Suzuki .................. G02B 27/09 359/558 |
| 6,040,549 A | 3/2000 | Kanaoka |
| 2004/0090521 A1 | 5/2004 | Endo et al. |
| 2005/0098260 A1 | 5/2005 | Chen |
| 2005/0174423 A1 | 8/2005 | Endo et al. |
| 2012/0187099 A1* | 7/2012 | Gubler ............... B23K 26/0676 219/121.75 |
| 2012/0256563 A1 | 10/2012 | Tsubota et al. |
| 2015/0183058 A1* | 7/2015 | Sugiyama ............... B23K 26/32 219/121.64 |
| 2015/0360320 A1 | 12/2015 | Yoshida et al. |
| 2016/0067832 A1* | 3/2016 | Kobayashi ............. B23K 26/24 219/121.83 |
| 2016/0084802 A1* | 3/2016 | Yusuf .................... G01N 29/045 73/582 |
| 2016/0159679 A1* | 6/2016 | West .................... B23K 26/402 65/112 |
| 2016/0181447 A1* | 6/2016 | Kim .................... H01L 31/0745 136/256 |
| 2016/0266393 A1* | 9/2016 | Trela-Mcdonald ......................... B23K 26/0732 |
| 2016/0361782 A1 | 12/2016 | Saito et al. |
| 2016/0377874 A1 | 12/2016 | Zhou et al. |
| 2017/0016781 A1* | 1/2017 | Dave .................... B23K 9/0953 |
| 2017/0090119 A1* | 3/2017 | Logan ............... G02B 27/0994 |
| 2017/0304941 A1* | 10/2017 | Usuda .................... B23K 26/38 |
| 2018/0088358 A1* | 3/2018 | Kliner .................... B33Y 10/00 |
| 2019/0389001 A1 | 12/2019 | Yasuoka et al. |
| 2020/0290153 A1* | 9/2020 | Yasuda ................ B23K 26/064 |

FOREIGN PATENT DOCUMENTS

| | | |
|---|---|---|
| CN | 202126514 U | 1/2012 |
| CN | 104364044 A | 2/2015 |
| DE | 102016218938 A1 | 4/2018 |
| EP | 2960005 A1 | 12/2015 |
| EP | 3590648 A1 | 1/2020 |
| JP | S6423586 A | 1/1989 |
| JP | H04200988 A | 7/1992 |
| JP | 2003-509222 A | 3/2003 |
| JP | 2011-167709 A1 | 9/2011 |
| JP | 2012110905 A | 6/2012 |
| JP | 2012210660 A | 11/2012 |
| JP | 2013029748 A | 2/2013 |
| JP | 2016-128181 A1 | 7/2016 |
| JP | 2017113789 A | 6/2017 |
| JP | 2018069258 A | 5/2018 |
| WO | 01/21353 A1 | 3/2001 |
| WO | 2012102138 A1 | 8/2012 |
| WO | 2013186862 A1 | 12/2013 |
| WO | 2015146591 A1 | 10/2015 |
| WO | 2016209800 A1 | 12/2016 |

OTHER PUBLICATIONS

Examination Report for Indian Patent Application No. 201834033572 dated Jan. 31, 2020, 5 pages.
Notice of Reasons for Refusal for Japanese Patent Application No. 2017-176603, dated Jul. 23, 2019, 10 pages including English translation.
First Office Action for Chinese Patent Application No. 201811072503.4, dated Mar. 30, 2020, 27 pages.
Examination Report for United Kingdom Patent Application No. GB1814608.4, dated Apr. 2, 2020, 4 pages.
Combined Search and Examination Report for United Kingdom Patent Application No. GB1814608.4, dated Dec. 12, 2018, 10 pages.
Second Office Action for Chinese Patent Application No. 201811072503.4, dated Oct. 22, 2020, 37 pages.
Examination Report for United Kingdom Patent Application No. GB1814608.4 dated Sep. 20, 2021, 3 pages.
Notice of Reasons for Revocation for Japanese Patent Application No. 2017-176603 dated Apr. 1, 2021, 22 pages including English translation.
Kishimoto, T., et al., "Conversion of Energy Distribution with Kaleidoscope in Laser Processing: Effects of Cylindrical Pipes,"

(56) References Cited

OTHER PUBLICATIONS

Journal of the Japan Society for Precision Engineering, No. 56(3), 1990, pp. 575-580, 13 pages including English machine translation.
Corelase Arm Fiber Laser brochure, Corelase Oy, 2015, 4 pages.
Office Action for German Patent Application No. 102018122264.5, dated Sep. 10, 2021, 13 pages.

* cited by examiner

FIG. 1

| MODE | RATIO AMONG PEAK VALUES (SET VALUE) | | | BEAM INTENSITY DISTRIBUTION (RATIO TO MEASURED VALUE IN CENTRAL REGION) | | | | | EFFECTS ON WELDING | |
|---|---|---|---|---|---|---|---|---|---|---|
| | CENTRAL REGION | FIRST INTER-MEDIATE REGION | CIRCUM-FERENCE REGION | CENTRAL REGION | FIRST INTER-MEDIATE REGION | SECOND INTER-MEDIATE REGION | THIRD INTER-MEDIATE REGION | CIRCUM-FERENCE REGION | SPATTER REDUCTION | WELD STRENGTH |
| FIRST MODE | 7 | — | 3 | 100 | 2 | 0.5 | 1.5 | 5 | A | B |
| SECOND MODE | 8 | 2 | 1 | 100 | 7 | 4.6 | 1.2 | 0.6 | B | A |
| THIRD MODE | 6 | 1.5 | 2.5 | 100 | 8 | 3.8 | 1.6 | 3.0 | A | A |
| FOURTH MODE | 7 | — | 3 | 100 | 20 | 10 | 9.5 | 9.5 | A | B |
| FIFTH MODE | 10 | — | — | 100 | 1.5 | 0.8 | 0.8 | 0 | C | C |

LASER WELDING APPARATUS AND MANUFACTURING METHOD OF COMPONENT

CROSS-REFERENCE TO RELATED APPLICATIONS

The present application claims the benefit of Japanese Patent Application No. 2017-176603 filed on Sep. 14, 2017 with the Japan Patent Office, the entire disclosure of which is incorporated herein by reference.

BACKGROUND

The present disclosure relates to a laser welding apparatus and a manufacturing method of a component by laser welding using the laser welding apparatus.

There has been known laser welding in which a plurality of members are welded by radiating a beam. In a laser welding method described in Japanese Unexamined Patent Application Publication No. 2011-167709, an energy density distribution on an irradiated surface, to which a beam for welding is radiated, is a Gaussian distribution, and a peak energy density on the irradiated surface is equal to or greater than a specific value. This enables reduction in occurrence of blowholes.

SUMMARY

Laser welding may also be performed by using various types of lasers. However, characteristics of lasers may result in, for example, a case where spatter tends to be generated, or a case where a molten pool with a sufficient depth is not formed, and thus sufficiently strong welding cannot be achieved. Herein, the molten pool means an area where a base material is melted by radiation of the beam.

It is preferable to reduce generation of spatter while obtaining a sufficient weld strength.

A laser welding apparatus of the present disclosure is configured to radiate a beam to a welding surface (transmit a radiation beam to the welding surface) in at least a part of a plurality of members to perform laser welding, and comprises a radiator. The radiator is configured to radiate the beam to a main region and an auxiliary region on the welding surface. The auxiliary region is positioned on the welding surface to be adjacent to the main region or to be apart from the main region. A welding direction is a direction in which a beam radiation region moves along the welding surface during the laser welding. Also, the auxiliary region includes at least an area positioned on a forward side of the main region in the welding direction. The radiator is configured to radiate the beam in a setting such that at least one peak occurs in each of the main region and the auxiliary region, and configured such that the beam radiated to the main region has an average intensity greater than an average intensity of the beam radiated to the auxiliary region. The peak here means a state where an intensity of the beam has a local maximum.

In the molten pool formed in the base material during laser welding, part of the melted base material moves outward, and then generates spatter when coming out of the molten pool. In contrast, with the configuration of the present disclosure, a deep molten pool is formed in an area, including the main region, on the welding surface, and a shallow molten pool to reduce generation of spatter is formed adjacent to the deep molten pool. In this case, the part of the melted base material moving outward in the deep molten pool of the main region is absorbed by the shallow molten pool adjacent to the deep molten pool; thus, external scattering of the part of the melted base material as spatter can be avoided.

Also, with the configuration as described above, the auxiliary region includes at least an area positioned on the forward side of the main region in the welding direction. Thus, during laser welding in the welding direction, each radiation target region first receives a low intensity beam toward the auxiliary region, and then receives a high intensity beam toward the main region. Accordingly, rapid increase in intensity of beams to be radiated can be avoided, and thus, reduction in size and/or generation amount of spatter can be achieved.

Also, radiating the beam to the auxiliary region allows a large width of the deep molten pool formed in the main region, leading to an improved weld strength. Accordingly, generation of spatter can be reduced while achieving a sufficient weld strength.

The auxiliary region may be an area that surrounds the main region.

With such configuration, regardless of in which direction laser welding is performed, each radiation target region first receives a low intensity beam toward the auxiliary region, and then receives a high intensity beam toward the main region. Accordingly, regardless of the direction of laser welding, generation of spatter can be reduced, and no limitation is imposed with respect to the direction of laser welding. Accordingly, laser welding can be performed more properly.

Also, the radiator may radiate the beam in a setting such that the at least one peak occurs in a central region that is positioned in the main region and in an outer region that is positioned in the auxiliary region and surrounds the central region.

With such configuration, an intensity of the beam in the auxiliary region can be adjusted appropriately.

Further, the radiator may radiate the beam in a setting such that the at least one peak occurs in a first region that is positioned in the main region, in a third region that is positioned in the auxiliary region, and in a second region that is positioned between the first region and the third region.

With such configuration, the molten pool formed in the main region can be widened, and a deep recess (hereinafter a "keyhole") formed at the center of the molten pool in the main region can be widened to obtain a stable keyhole. As a result, an improved weld strength of the plurality of members welded by laser welding can be achieved.

An intensity of the beam in the first region may be greater than an intensity of the beam in the third region, and the intensity of the beam in the third region may be greater than an intensity of the beam in the second region.

With such configuration, generation of spatter can be further reduced.

The intensity of the beam in the first region may be greater than the intensity of the beam in the second region, and the intensity of the beam in the second region may be greater than the intensity of the beam in the third region.

With such configuration, an improved weld strength of the plurality of members welded by laser welding can be achieved.

The laser welding apparatus may further comprise a generator configured to generate the beam by amplifying a light emitted by a laser medium. The radiator may set an intensity distribution of the beam generated by the generator using a changing member to change a traveling direction of a light.

With such configuration, the intensity distribution of the beam can be set flexibly. Thus, it is possible to flexibly set positions of peaks, for example, in accordance with the size or properties of the base material, and to perform laser welding of various base materials properly.

The radiator may be configured to alter the intensity distribution of the beam generated by the generator by altering the changing member.

With such configuration, the intensity distribution of the beam can be easily altered, for example, depending on the base material. Accordingly, laser welding can be performed properly.

The laser welding apparatus may be configured as a fiber laser.

With such configuration, laser welding can be performed properly.

Further, a component may be manufactured by welding a plurality of member by laser welding using the above-described laser welding apparatus.

According to such manufacturing method, generation of spatter can be reduced during laser welding, while achieving a sufficient weld strength.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

The present disclosure is not limited to below-described embodiment, but may be embodied in various forms within the technical scope of the present disclosure.

Description of Laser Welding Apparatus

A laser welding apparatus of the present embodiment radiates a beam to a welding surface in at least a part of a plurality of members, in order to weld the plurality of members by laser welding. The plurality of members here may be, for example, members made of iron or an iron alloy, members made of a metal other than iron, or members made of a material other than metal. Also, the welding surface may be provided to an outer surface of one of the members, or may be provided over respective outer surfaces of the members. Further, the laser welding apparatus may be configured, for example, as a fiber laser or may be configured as one of various other types of lasers, such as a solid-state laser and a gas laser.

Figure 1:
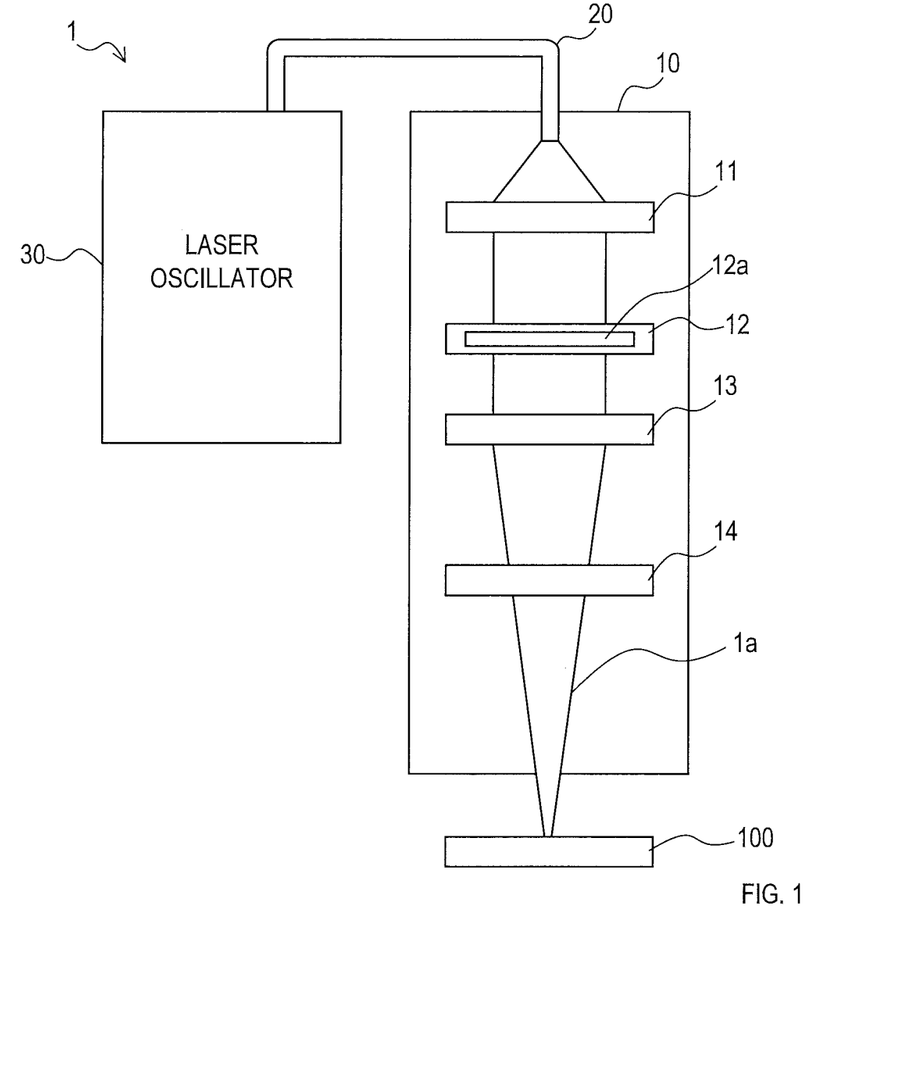
FIG. 1 is an explanatory diagram showing a configuration of a laser welding apparatus.

As shown in FIG. 1, a laser welding apparatus 1 comprises a laser oscillator 30, a light path 20, and a processing head 10.

The laser oscillator 30 excites a laser medium and amplifies a light emitted by the excited laser medium, to thereby generate a beam 1a. In a case where the laser welding apparatus 1 is configured as a fiber laser, a rare earth-added fiber may be used as the laser medium.

The light path 20 guides the beam 1a generated by the laser oscillator 30 to the processing head 10.

The processing head 10 radiates the beam 1a to a plurality of members 100, which are base materials, to perform laser welding. The processing head 10 comprises a collimation device 11, a mode setting device 12, a focusing lens 13, and a position corrector 14. The processing head 10 need not include the position corrector 14.

The collimation device 11 is configured to adjust a direction of the beam 1a guided from the laser oscillator 30 using, for example, a lens and/or a mirror.

The mode setting device 12 is configured to set a mode of the beam 1a using a changing member 12a, such as a lens and/or a Diffractive Optical Element (DOE), to change a traveling direction of a light. "Mode" here means a distribution pattern of an intensity of the beam 1a in a radiation region of the beam 1a. The intensity of the beam 1a may be, for example, an energy density of the beam 1a. Specifically, when the beam 1a, whose direction has been adjusted by the collimation device 11, passes through the lens or the like provided at the mode setting device 12, the mode of the beam 1a is set. In one example, the mode is changed by altering the changing member 12a provided at the mode setting device 12.

The focusing lens 13 is configured to adjust a degree of convergence of the beam 1a, for which the mode has been set by the mode setting device 12. During welding, the degree of convergence of the beam 1a is adjusted such that the beam 1a converges immediately before the materials.

The position corrector 14 is configured to adjust a target position of the beam 1a, which has passed through the focusing lens 13.

Details of Modes

As described above, the laser welding apparatus 1 can radiate the beam in a plurality of modes. The modes may be appropriately set in accordance with, for example, dimensions of the base materials, properties of the base materials, or a moving speed of a beam radiation region (a region that receives the beam radiation, or a radiation target region) during laser welding. In at least some of the modes, the beam is radiated to a main region and an auxiliary region on the welding surface of the plurality of members 100, which are the base materials. The beam may be set to be radiated to a part of each of the main and auxiliary regions, or may be set to be radiated all over each of the main and auxiliary regions. The auxiliary region is positioned in a vicinity of the main region. Specifically, the auxiliary region may be positioned adjacent to the main region, or may be positioned at a specified distance or less apart from the main region. Also, the auxiliary region includes at least an area on a forward side of the main region in a welding direction. The welding direction here means a direction in which the beam radiation region moves along a welding surface during laser welding.

An intensity of the beam radiated to the main region is greater than an intensity of the beam radiated to the auxiliary region. More specifically, the laser welding apparatus 1 radiates the beam in a setting such that at least one peak occurs in each of the main region and the auxiliary region. Also, an average intensity of the beam radiated to the main region is greater than an average intensity of the beam radiated to the auxiliary region. The peak here means a state having a local maximum of a beam intensity. Specifically, the peak means a state in which the beam intensity shows a relative maximum, that is, the beam intensity becomes maximal. Changes in the beam intensity around the peak turn from increase to decrease. Hereinafter, the beam intensity at the peak is referred to as a "peak value".

The beam is radiated to the main region so as to form a deep molten pool to weld the plurality of members 100, which will be further detailed below. The molten pool here means an area melted by the radiation of the beam in the plurality of members 100. In contrast, the beam is radiated to the auxiliary region so as to form a shallow molten pool to reduce generation of spatter. The molten pool formed in the auxiliary region is located adjacent to and shallower than the molten pool formed in an area including the main region on the welding surface.

The present embodiment provides a plurality of modes, including first to third modes, in each of which the above-described main region and auxiliary region are provided. The first to third modes will be described below. Hereinafter, a dot-like region as shown in FIG. 2B is referred to as a "central region". Also, a plurality of circumferential regions around the central region are referred to as a "first intermediate region", a "second intermediate region", a "third intermediate region", and a "circumference region". A magnitude relationship among respective radii of these regions is as follows: radius of the circumference region>radius of the third intermediate region>radius of the second intermediate region>radius of the first intermediate region.

Figure 2A:
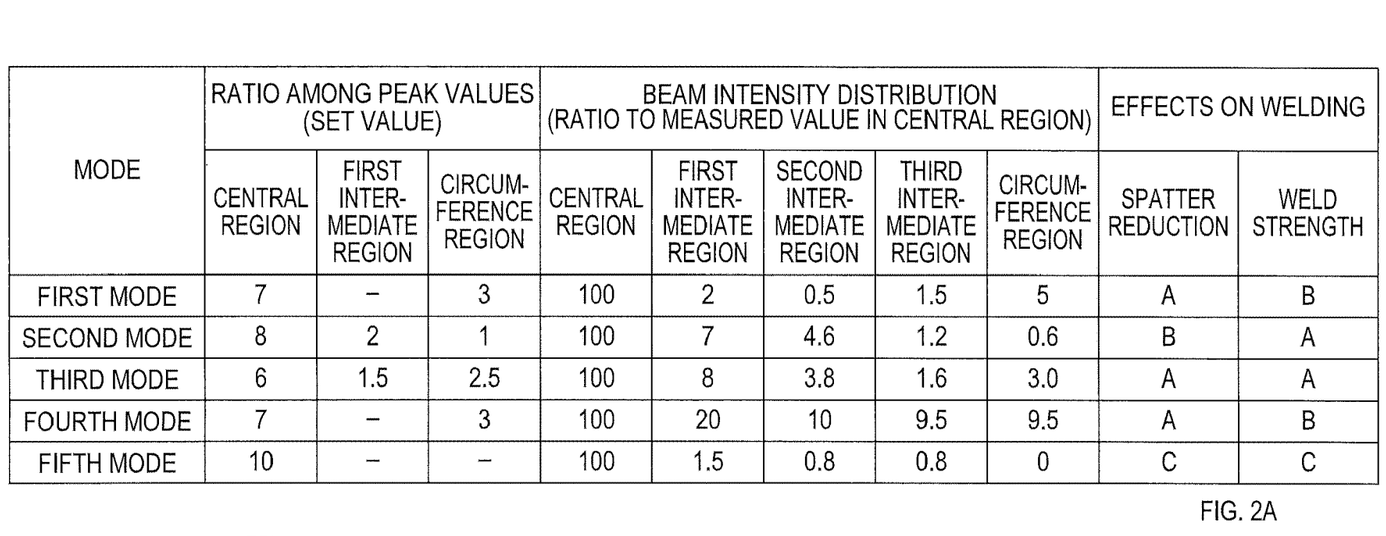
FIG. 2A is a table showing an intensity distribution and evaluation results on effects on welding for each of beams in first to fifth modes.
Figure 2B:
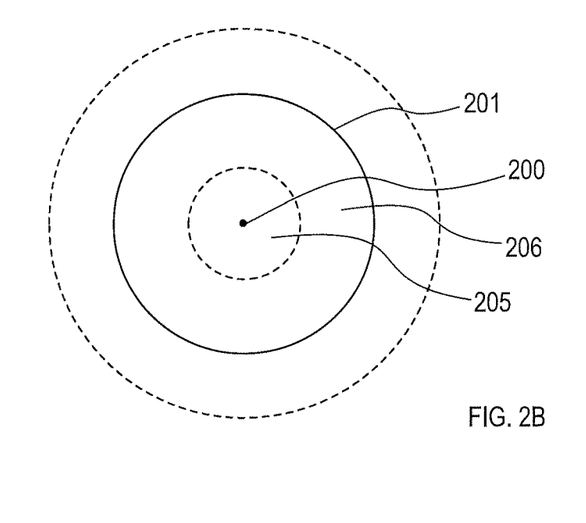
FIG. 2B is an explanatory diagram showing a central region, a circumference region, a main region, and an auxiliary region in the first mode.
Figure 2C:
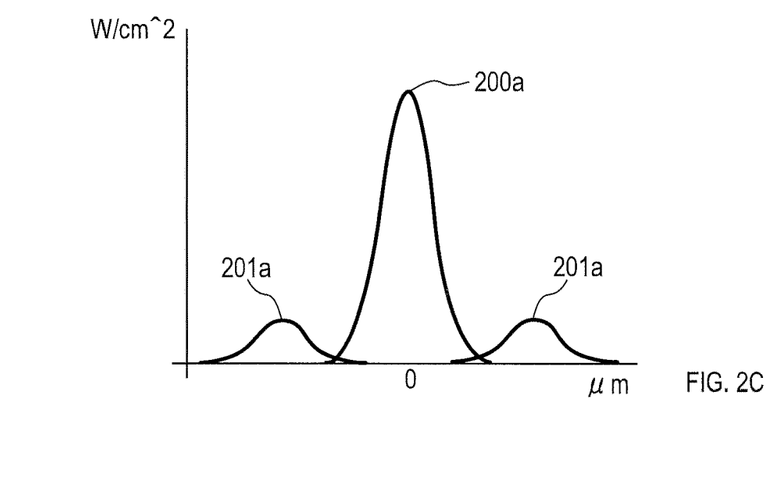
FIG. 2C is a graph showing a setting of the intensity distribution of the beam in the first mode.

In the first mode, as shown in FIGS. 2A and 2B, a beam is radiated to the welding surface in a setting such that peaks occur at a central region 200 and a circumference region 201. Also, a beam intensity ratio is set to 7:3 between a peak value 200a in the central region 200 and a peak value 201a in the circumference region 201, as shown in FIG. 2C.

Figure 3A:
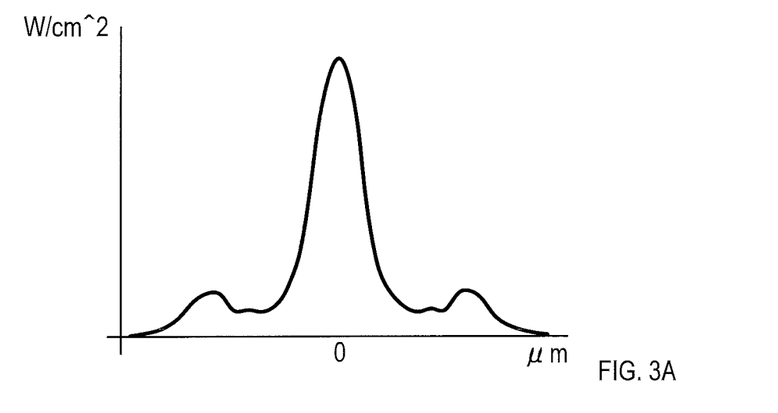
FIG. 3A is a graph showing measured values of the intensity distribution of the beam in the first mode.

Thus, in one example, a circular region having a diameter of approximately several hundred micrometers around the central region 200 is a main region 205. Also, a ring-shaped region adjacent to and surrounding the main region 205 is an auxiliary region 206. In other words, the main region 205 and the auxiliary region 206 are arranged coaxially. The main region 205 and the auxiliary region 206 may be arranged substantially coaxially. In the first mode, as shown in FIG. 2C, the beam is set to be radiated to the welding surface in such a state where the beam radiated to the main region 205 has a greater intensity than that of the beam radiated to the auxiliary region 206. Accordingly, as shown in FIG. 3A, the intensity of the beam actually radiated to the main region 205 is greater than the intensity of the beam actually radiated to the auxiliary region 206.

Figure 3B:
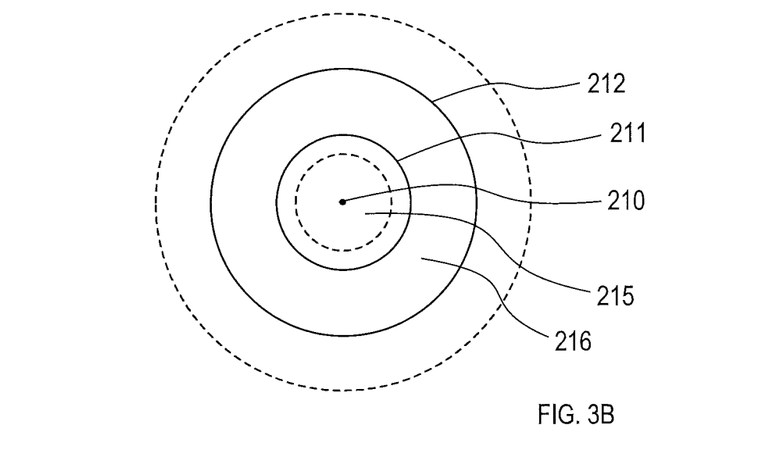
FIG. 3B is an explanatory diagram showing a central region, a circumference region, a main region, and an auxiliary region in the second mode.
Figure 3C:
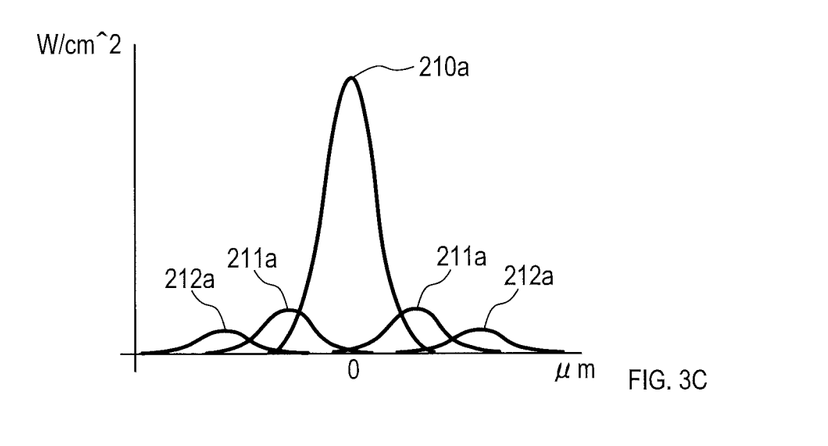
FIG. 3C is a graph showing a setting of the intensity distribution of the beam in the second mode.

In the second mode, as shown in FIGS. 3B and 3C, a beam is radiated to the welding surface in a setting such that peaks occur in a central region 210, a first intermediate region 211, and a circumference region 212. A magnitude relationship among a first peak value 210a in the central region 210, a second peak value 211a in the first intermediate region 211, and a third peak value 212a in the circumference region 212 shown in FIG. 3C is as follows: the first peak value 210a>the second peak value 211a>the third peak value 212a. More specifically, in one example, a ratio among the first peak value 210a, the second peak value 211a, and the third peak value 212a is set to 8:2:1. The ratio may be changed appropriately within a range where the above mentioned magnitude relationship is maintained.

Figure 4A:
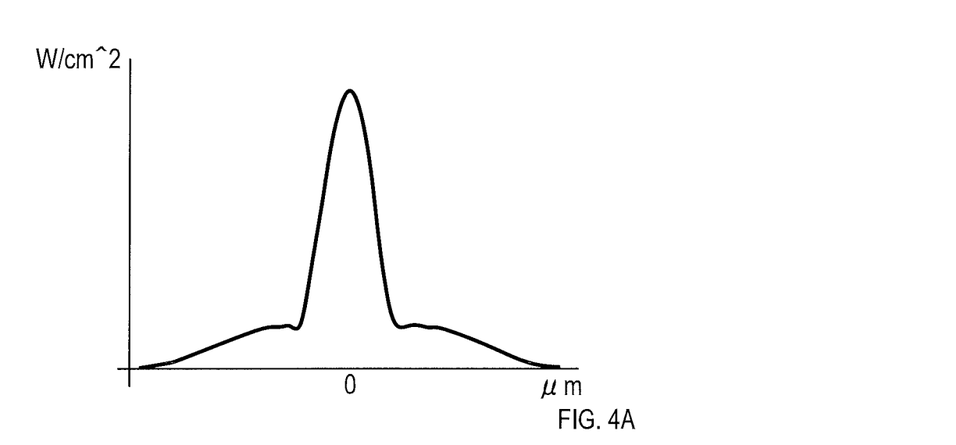
FIG. 4A is a graph showing measured values of the intensity distribution of the beam in the second mode.

Thus, in one example, a circular region having a diameter of approximately several hundred micrometers around the central region 210 is a main region 215. Also, a ring-shaped region adjacent to and surrounding the main region 215 is an auxiliary region 216. In other words, the main region 215 and the auxiliary region 216 are arranged coaxially. The main region 215 and the auxiliary region 216 may be arranged substantially coaxially. Also, the central region 210 is located in the main region 215, and the circumference region 212 is located in the auxiliary region 216. The first intermediate region 211 is located between the main region 215 and the circumference region 212. As shown in FIG. 3C, in the second mode, the beam is radiated to the welding surface in a setting such that the beam radiated to the main region 215 has a greater intensity than that of the beam radiated to the auxiliary region 216. Accordingly, as shown in FIG. 4A, the intensity of the beam actually radiated to the main region 215 is greater than the intensity of the beam actually radiated to the auxiliary region 216.

Figure 4B:
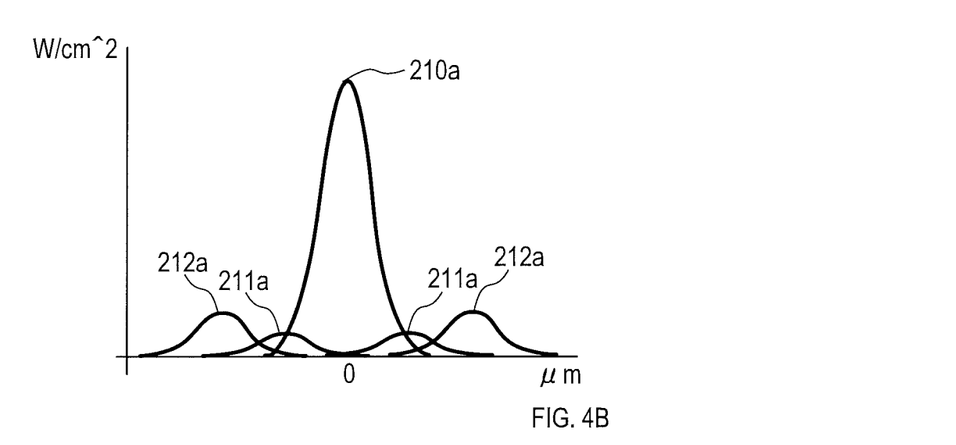
FIG. 4B is a graph showing a setting of the intensity distribution of the beam in the third mode.

In the third mode, similarly to the second mode, a beam is radiated to the welding surface in a setting such that peaks occur in the central region 210, the first intermediate region 211, and the circumference region 212. However, as shown in FIG. 4B, the third mode is different from the second mode in that the first to third peak values 210a to 212a have the following magnitude relationship: the first peak value 210a>the third peak value 212a>the second peak value 211a. More specifically, in the third mode, a ratio among the first peak value 210a, the second peak value 211a, and the third peak value 212a is set to 6:1.5:2.5 in one example. The ratio may be appropriately changed within a range where the above mentioned magnitude relationship is maintained.

Figure 4C:
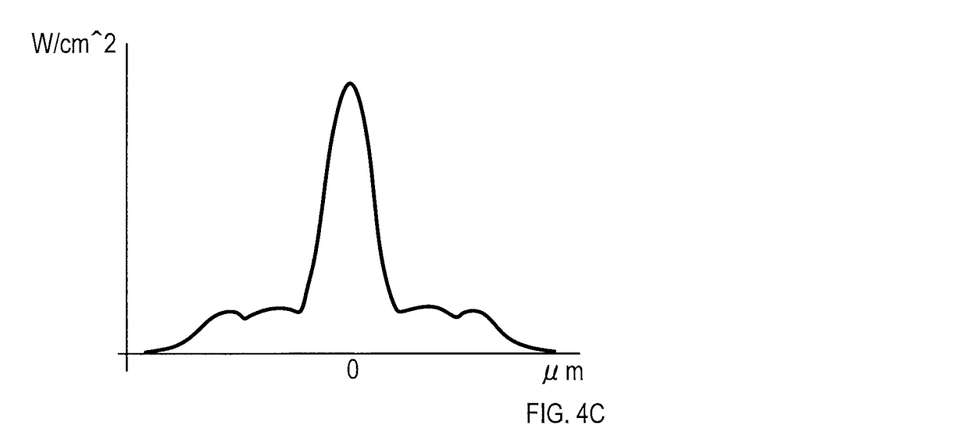
FIG. 4C is a graph showing measured values of the intensity distribution of the beam in the third mode.

Thus, in one example, a circular region having a diameter of approximately several hundred micrometers around the central region 210 is the main region 215, similarly to the second mode. Also, a ring-shaped region adjacent to and surrounding the main region 215 is the auxiliary region 216. As shown in FIG. 4B, in the third mode, the beam is radiated to the welding surface in a setting such that the intensity of the beam radiated to the main region 215 is greater than the intensity of the beam radiated to the auxiliary region 216. Accordingly, as shown in FIG. 4C, the intensity of the beam actually radiated to the main region 215 is greater than the intensity of the beam actually radiated to the auxiliary region 216.

Manufacturing Method of Welded Member

In a manufacturing method of a welded member according to an embodiment of the present disclosure, a mode is selected first in accordance with, for example, properties, dimensions, or the like of the plurality of members 100 to be laser welded, and the changing member 12a is selected depending on the selected mode. Subsequently, the selected changing member 12a is set in the laser welding apparatus 1. Then, laser welding of the plurality of members 100 is performed by radiating a beam by the laser welding apparatus 1 as described above. A total thickness of the plurality of members 100 along a radiation direction of the beam may be, for example, 4 mm or more. The beam may be radiated, for example, in one of the first to third modes. Also, spot welding of the plurality of members 100 may be performed, or welding of the plurality of members 100 may be performed by moving a beam radiation region in a welding direction. As a result of such welding, a welded member including the welded plurality of members 100 is manufactured. The welded member may be, for example, a component for use in vehicles, such as automobiles.

When the beam is radiated to a welding surface, base materials are melted to form a molten pool in each of a main region and an auxiliary region. As described above, an intensity of the beam radiated to the main region is greater than an intensity of the beam radiated to the auxiliary region. Thus, in an area including the main region on the welding surface, a deep and properly wide molten pool is formed so as to weld the plurality of members 100 with a sufficient strength. The beam may form a keyhole in the molten pool of the main region. The beam radiated to the auxiliary region forms a molten pool, which is adjacent to and shallower than the molten pool of the main region.

Figure 5A:
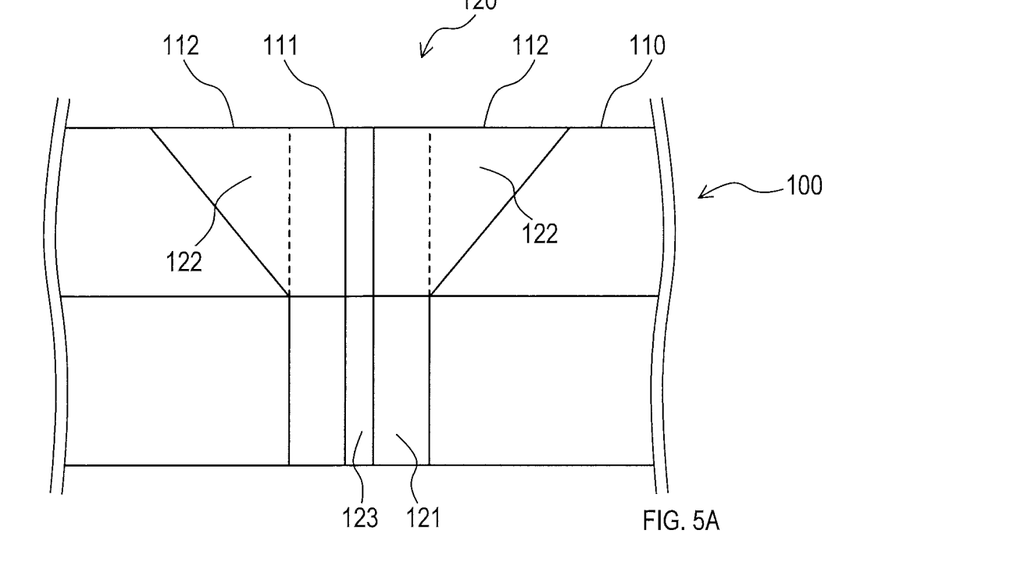
FIG. 5A is an explanatory diagram of a molten pool formed by radiating the beam in each of the first to third modes.

FIG. 5A shows a molten pool 120 formed in the plurality of members 100 by a beam in one of the first to third modes. By way of example, the plurality of members 100 are two stacked plate members, and a beam is radiated to a welding surface 110 located on an outer surface of an upper one of the plate members in FIG. 5A. Then, the beam radiated to a main region 111 forms a deep molten pool 121 that reaches a lower one of the plate members. FIG. 5A shows an example in which a keyhole 123 is formed at the center of the molten pool 121 of the main region. The beam radiated to an auxiliary region 112 forms a shallow molten pool 122 that surrounds and is adjacent to the molten pool 121 of the main region 111. A circumference region is located in an area where the shallow molten pool 122 in the welding surface 110 is formed.

In the molten pool 121 of the main region 111, part of the melted base material moves upward toward the welding surface, causing spatter when the part of the melted base material comes out of a molten surface. In contrast, in the present embodiment, the shallow molten pool 122 is formed in the auxiliary region 112 so as to be adjacent to the deep molten pool 121 of the main region 111. Accordingly, the part of the melted base material, which moves toward the welding surface in the molten pool 121 of the main region 111, is absorbed by the molten pool 122 of the auxiliary region 112; thus, external scattering of the part of the melted base material as spatter can be avoided. Accordingly, generation of spatter can be reduced.

Modified Examples

In the first to third modes, setting of the beam is such that peaks occur in the circumference region, or in the circumference region and the first intermediate region. However, setting of the beam may be such that peaks occur at one or more dot-like or linear regions, in place of the aforementioned regions, located on a forward side of the central region in the welding direction.

Figure 5B:
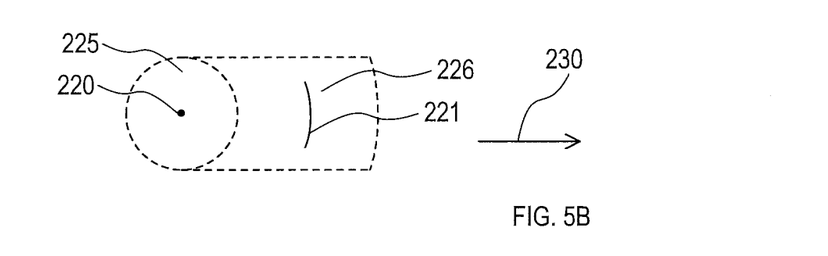
FIG. 5B is an explanatory diagram showing a main region and an auxiliary region in a modified example of the first mode.

Specifically, as shown in FIG. 5B, for example, setting of the beam may be such that a peak occurs in an arcuate section 221, which is a part of the circumference region 201, in place of the circumference region 201 in the first mode. The section 221 is located on a forward side of a central region 220 in a welding direction 230. In this case, a main region 225 having a circular shape is formed, and an auxiliary region 226 having a strip shape is also formed adjacent to a forward side of the main region 225 in the welding direction 230.

Further, for example, in the second or the third mode, setting of the beam may be such that peaks occur in an arcuate section, which is a part of the first intermediate region 211, and in another arcuate section, which is a part of the circumference region 212, in place of the first intermediate region 211 and the circumference region 212. These sections are located on the forward side of the central region in the welding direction. Also in this case, a circular main region is formed, and a strip-shaped auxiliary region is formed adjacent to the forward side of the main region in the welding direction.

Also in cases where these modified examples are employed, a deep molten pool similar to that in the first to third modes is formed in an area including the main region on the welding surface. In addition, a shallow molten pool is formed adjacent to the forward side of the molten pool of the main region in the welding direction by the beam radiated to the auxiliary region. Thus, similarly to the first to third modes, a part of the melted base material that moves upward in the molten pool of the main region is absorbed by the molten pool of the auxiliary region; thus, external scattering of the part of the melted base material as spatter can be avoided.

Comparison Among Modes

Next, a description will be given of effects on welding when laser welding is performed in each of the above-described first to third modes and in a fourth mode, which are examples of the present disclosure. Also, a description will be given of effects on welding when laser welding is performed in a fifth mode, as a comparative example relative to the first to fourth modes.

Figure 5C:
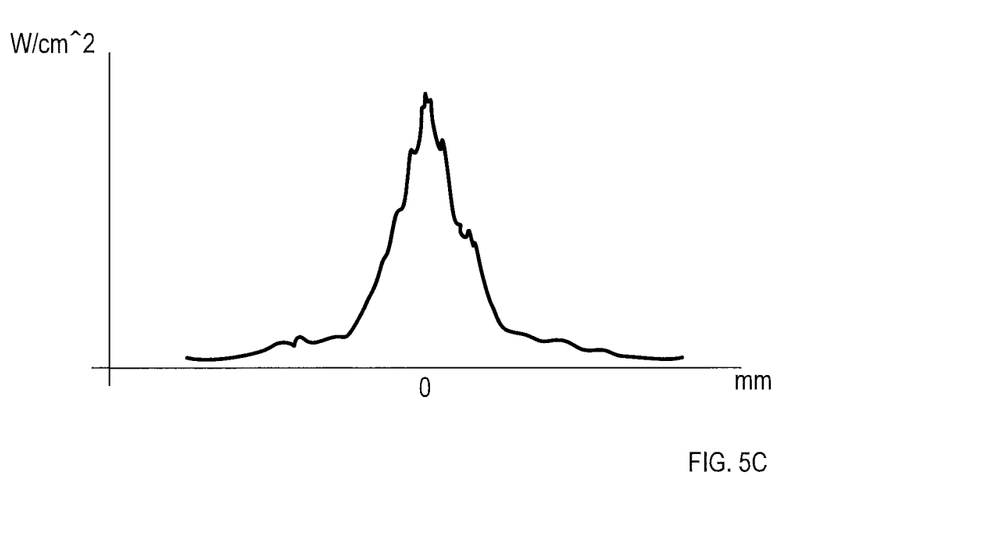
FIG. 5C is a graph showing measured values of the intensity distribution of the beam in the fifth mode.

In the fourth mode, a beam is radiated to a welding surface in a setting such that peaks occur in a central region and a circumference region similarly to the first mode, and a beam intensity ratio between the central region and the circumference region is set to 7:3. Thus, the beam is radiated to a circular region also in the fourth mode. In the fourth mode, however, the degree of convergence of the beam is insufficient, and thus the beam is not sufficiently converged immediately before the base material. Accordingly, as shown in FIG. 5C, the beam radiation region is widened in the fourth mode.

In the fifth mode, as shown in FIG. 2A, a beam is radiated to a welding surface in a setting such that a peak occurs only in a central region. Thus, in the fifth mode, the beam is radiated to a circular region around the central region. That is, in the fifth mode, the beam is radiated to only the main region in a similar manner to the first to third modes, and the beam is not radiated to the auxiliary region.

FIG. 2A shows respective beam intensity ratios (hereinafter, measured value ratios) of the first to third intermediate regions and the circumference region relative to the central region when each of the first to fifth modes is employed. Specifically, the measured value ratio is a ratio of a measured value of the beam intensity in each region to a measured value of the beam intensity in the central region, and is calculated assuming that the beam intensity in the central region is 100. Also, FIG. 2A shows, using three grades A to C, a level of spatter reduction and an evaluation result on weld strength when each of the first to fifth modes is employed.

The grades are from low to high in the order of C, B, and A. When the evaluation result on weld strength is "A", the molten pool of the main region has a large width, and a keyhole is formed in the molten pool in a stable condition. The level of spatter reduction indicates a level of reduction in amount and/or size of spatter.

The evaluation results shown in FIG. 2A are considered to indicate the following:

(1) When the beam intensity is set such that the measured value ratio of the third intermediate region is 1.2 or more, the level of spatter reduction is improved. Also, when the beam intensity is set such that the measured value ratio of the third intermediate region is 1.5 or more, the level of spatter reduction is further improved.

(2) When the beam intensity is set such that the measured value ratio of the second intermediate region is 3.8 or more, the level of spatter reduction is improved. Also in this case, the deep molten pool formed in the main region has a large width, and a keyhole is formed in the molten pool in a stable condition, thereby achieving a sufficient weld strength. The beam intensity may further be set such that the measured value ratio of the second intermediate region is 3.8 or more and 4.6 or less.

(3) When the beam intensity is set such that the measured value ratio of the first intermediate region is 7 or more, similar effects as in (2) above can be obtained. The beam intensity may further be set such that the measured value ratio of the first intermediate region is 7 or more and 8 or less.

(4) In a case of setting where peaks occur in the central region, the first intermediate region, and the circumference region, the ratio among a setting value of a peak value of the central region, a setting value of a peak value of the first intermediate region, and a setting value of a peak value of the circumference region is indicated by X0:Y0:Z0. If respective value ranges of X0, Y0, and Z0 are set to $6 \leq X0 \leq 8$, $1.5 \leq Y0 \leq 2$, and $1 \leq Z0 \leq 2.5$, then similar effects as in (2) above can be obtained.

(5) The ratio of the setting value of the peak value of the central region to the setting value of the peak value of the circumference region is indicated by X1:Z1. If respective value ranges of X1 and Z1 are set to $6 \leq X1 \leq 8$ and $1 \leq Z1 \leq 3$, then generation of spatter can be reduced while achieving a sufficient weld strength.

(6) The beam intensity may be set such that the measured value ratio of the first intermediate region is 2 or more. The beam intensity may further be set such that the measured value ratio of the first intermediate region is 2 or more, while X1 and Z1 are within the value ranges indicated in (5) above. Under such condition, generation of spatter can be reduced, while achieving a sufficient weld strength.

(7) Also, by setting respective value ranges of X1 and Z1 to $6 \leq X1 \leq 8$ and $1 \leq Z1 \leq 2.5$, similar effects as in (2) above can be obtained. Additionally, the beam intensity may be set such that the measured value ratio of the first intermediate region is 7 or more, and/or the measured value ratio of the third intermediate region is 1.2 or more. Under such condition, similar effects as in (2) above can be obtained.

(8) Also, the beam intensity may be set such that the measured value ratio of the circumference region is 0.6 or more. This provides an improved level of spatter reduction. Also, the beam intensity may be set such that the measured value ratio of the circumference region is 3.0 or more. This provides a further improved level of spatter reduction. Further, the beam intensity may be set such that the measured value ratio of the circumference region is 0.6 or more and 3.0 or less. Under such condition, more appropriate weld strength can be achieved.

Effects (1) A fiber laser has good light converging properties and provides high output power. Thus, using a fiber laser for laser welding results in formation of a narrow deep molten pool in the base material, as compared with the case of using, for example, a $CO_2$ laser. Thus, the molten pool is unstable, and a lot of spatter is generated. This requires a spatter cover to block spatter, and arrangement of such spatter cover may impede laser welding. Also, when a fiber laser is used for laser welding, a welded portion is narrow, and a keyhole formed in a molten pool is narrow and unstable, which results in low weld strength.

In contrast, when the laser welding apparatus 1 of the above-described embodiment is configured as a fiber laser, the shallow molten pool is formed adjacent to the molten pool of the main region as described above. This reduces generation of spatter; thus, use of a spatter cover can be avoided, or a smaller spatter cover can be employed.

The auxiliary region includes at least an area positioned on the forward side of the main region in the welding direction. Thus, during laser welding in the welding direction, each radiation target region first receives a low intensity beam toward the auxiliary region, and then receives a high intensity beam toward the main region. Accordingly, rapid increase in intensity of radiated beams can be avoided, and reduction in amount and/or size of spatter can be achieved.

Also, radiating the beam to the auxiliary region allows a large width of the deep molten pool of the main region and allows a reduction in variation of the width. This leads to an improved weld strength and a reduced time required for laser welding.

Accordingly, generation of spatter can be reduced, while achieving a sufficient weld strength. Particularly, according to the laser welding apparatus 1 of the above-described embodiment, generation of spatter can be reduced, while achieving a sufficient weld strength, even if the base material has a thickness of, for example, 4 mm or more.

(2) According to the above-described embodiment, the main region and the auxiliary region are provided coaxially or substantially coaxially. Thus, regardless of the direction of laser welding, each radiation target region first receives a low intensity beam toward the auxiliary region, and then receives a high intensity beam toward the main region. Accordingly, regardless of the direction of laser welding, generation of spatter can be reduced, and no limitation is imposed with respect to the direction of laser welding. That is, it is possible to reduce causing of directivity in laser welding, to reduce generation of spatter, and to perform laser welding in all directions while reducing fluctuation in welding quality. Accordingly, laser welding can be performed more appropriately.

(3) In each of the second and third modes, another peak is set in the first intermediate region 211 in addition to the central region and the circumference region 212. Thus, the beam intensity around a boundary of the main region is high as compared with the first mode. Accordingly, the molten pool of the main region has a large width, and the keyhole formed at the center of the molten pool of the main region is widened, thereby making the keyhole stable. As a result, an improved weld strength of the plurality of members 100 can be achieved.

(4) In the third mode, the peak value of the first intermediate region 211 is less than the peak value of the circumference region 212. This enables further reduction in generation of spatter.

(5) In the second mode, the peak value of the first intermediate region 211 is greater than the peak value of the circumference region 212. With such configuration, an improved weld strength of the plurality of members 100 can be achieved.

(6) According to the laser welding apparatus 1 of the above-described embodiment, a beam is generated by amplifying a light emitted by the laser medium using, for example, the laser oscillator 30. Then, at the mode setting device 12 of the processing head 10, the mode of the generated beam is set. This enables flexible mode setting as compared with, for example, a case of setting a mode in a step of generating a beam by the laser oscillator 30 or the like. Accordingly, mode setting can be performed flexibly in accordance with, for example, the size or properties of the base material, and laser welding of various base materials can be performed appropriately.

(7) By altering the changing member 12a of the mode setting device 12, the mode can be changed. Accordingly, mode setting can be performed flexibly in accordance with, for example, the size or properties of the base material, and laser welding of various base materials can be performed appropriately.

Other Embodiments (1) The modes of the laser welding apparatus 1 in the above-described embodiment are not limited to the first to third modes, which are indicated by way of example. Specifically, although the main region is circular, and the auxiliary region is ring-shaped in the first to third modes, the shape of the main region or the auxiliary region may be altered, for example, by altering the shape of the central region or the circumference region in which a peak of the beam occurs. In the second and third modes, peaks are set in two circumference regions that are concentrically positioned. However, peaks may be set, for example, in three or more circumference regions that are concentrically positioned. That is, peaks may be set in three or more regions in the auxiliary region. Also, peaks may be set in, for example, two or more regions in the main region.

(2) In the laser welding apparatus 1 of the above-described embodiment, the mode of the beam is set by passage of the beam through a lens or the like provided to the mode setting device 12. However, a mode setting method of the beam is not limited to this. Specifically, the mode of the beam may be set, for example, by superimposing beams generated by a plurality of laser oscillators.

(3) It may be possible to divide a function performed by one element in the above-described embodiment to a plurality of elements, or to integrate functions of a plurality of elements into one element. Also, the configurations in the above-described embodiment may be partly omitted only if the problems to be solved can be cleared. Any form that falls within the scope of the technical idea defined by the language of the appended claims may be an embodiment of the present disclosure.

Correspondence to Claims

Correspondence between the terms used to describe the embodiment above and the terms recited in the appended claims will be indicated below.

The processing head 10 corresponds to one example of a radiator, and the laser oscillator 30 corresponds to one example of a generator. The central region 210 corresponds to one example of a first region, the first intermediate region 211 corresponds to one example of a second region, and the circumference region 212 corresponds to one example of a third region. Also, the first intermediate region 211, the circumference region 201, and the circumference region 212 each correspond to one example of an outer region.

What is claimed is:

1. A laser welding apparatus configured to radiate a beam to a welding surface in at least a part of a plurality of metal members to perform laser welding, the laser welding apparatus comprising:
a radiator configured to radiate the beam to a main region on the welding surface and an auxiliary region on the welding surface, the auxiliary region being a region that surrounds the main region and being positioned adjacent to the main region;
wherein the radiator is configured to radiate the beam in a setting such that at least one peak occurs in each of the main region and the auxiliary region, and is configured such that the beam radiated to the main region has an average intensity greater than an average intensity of the beam radiated to the auxiliary region, the at least one peak being a state where an intensity of the beam has a local maximum,
wherein the at least one peak occurs in a central region located in the main region and having a dot shape,
wherein the at least one peak occurs in an outer region located in the auxiliary region,
wherein the outer region surrounds the central region;
wherein the radiator radiates the beam in a setting such that the at least one peak occurs in a first region, which is the central region, and in a second region and a third region, which are portions of the outer region;
wherein the second region is positioned between the first region and the third region; and
wherein the radiator is further configured to alter between the following intensity profiles (i) and (ii):
 (i) an intensity of the beam in the first region is greater than an intensity of the beam in the third region, and the intensity of the beam in the third region is greater than an intensity of the beam in the second region; and
 (ii) an intensity of the beam in the first region is greater than an intensity of the beam in the second region, and the intensity of the beam in the second region is greater than an intensity of the beam in the third region.

2. The laser welding apparatus according to claim 1, further comprising:
  a generator configured to generate the beam by amplifying a light emitted by a laser medium,
  wherein the radiator sets an intensity distribution of the beam generated by the generator using a changing member to change a traveling direction of a light, the changing member including a lens and/or a diffractive optical element.

3. The laser welding apparatus according to claim 2,
  wherein the radiator is configured to alter the intensity distribution of the beam generated by the generator by altering the changing member.

4. The laser welding apparatus according to claim 1,
  wherein the laser welding apparatus is configured as a fiber laser.

5. A method of manufacturing a component by welding a plurality of metal members by laser welding using a laser welding apparatus that comprises a radiator configured to radiate a beam to a main region and to an auxiliary region both on a welding surface in at least a part of a plurality of metal members to perform laser welding, the auxiliary region being a region that surrounds the main region and being positioned adjacent to the main region, the method comprising:
  radiating the beam in a setting such that at least one peak occurs in each of the main region and the auxiliary region, and is configured such that the beam radiated to the main region has an average intensity greater than an average intensity of the beam radiated to the auxiliary region, the at least one peak being a state where an intensity of the beam has a local maximum;
  wherein the at least one peak occurs in a central region located in the main region and having a dot shape, and the at least one peak occurs in an outer region located in the auxiliary region, the outer region surrounding the central region;
  wherein the radiator radiates the beam in a setting such that the at least one peak occurs in a first region, which is the central region, and in a second region and a third region, which are portions of the outer region;
  wherein the second region is positioned between the first region and the third region;
  wherein the average intensity of the beam radiated to the main region is greater than the average intensity of the beam radiated to the auxiliary region, whereby a first molten pool and a second molten pool are formed;
  wherein the first molten pool is formed in an area including the central region;
  wherein the second molten pool is formed in an area including the outer region, the second molten pool reducing generation of spatter, being adjacent to and surrounding the first molten pool, and being shallower than the first molten pool; and
  wherein the radiator is further configured to alter between the following intensity profiles (i) and (ii):
    (i) an intensity of the beam in the first region is greater than an intensity of the beam in the third region, and the intensity of the beam in the third region is greater than an intensity of the beam in the second region; and
    (ii) an intensity of the beam in the first region is greater than an intensity of the beam in the second region, and the intensity of the beam in the second region is greater than an intensity of the beam in the third region.

6. The method of manufacturing a component according to claim 5,
  wherein a ratio of a measured value of the intensity of the beam in the outer region to a measured value of the intensity of the beam in the central region is expressed as a measured value ratio when the measured value of the intensity of the beam in the central region is 100, and
  the measured value ratio is 0.6 or more.

7. The method of manufacturing a component according to claim 5,
  wherein a ratio of a setting value of the beam in the central region to a setting value of the beam in the outer region is expressed as X1:Z1, and
  wherein respective value ranges of X1 and Z1 are $6 \leq X1 \leq 8$ and $1 \leq Z1 \leq 3$.

8. The laser welding apparatus according to claim 1,
  wherein a ratio of a measured value of the intensity of the beam in the outer region to a measured value of the intensity of the beam in the central region is expressed as a measured value ratio when the measured value of the intensity of the beam in the central region is 100, and
  the measured value ratio is 0.6 or more.

9. The laser welding apparatus according to claim 8, wherein the measured value ratio is in a range spanning from 0.6 to 3.0.

10. The laser welding apparatus according to claim 1,
  wherein a ratio of a setting value of the beam in the central region to a setting value of the beam in the outer region is expressed as X1:Z1, and
  wherein respective value ranges of X1 and Z1 are $6 \leq X1 \leq 8$ and $1 \leq Z1 \leq 3$.

11. The laser welding apparatus according to claim 8, further comprising:
  a generator configured to generate the beam by amplifying a light emitted by a laser medium,
  wherein the radiator sets an intensity distribution of the beam generated by the generator using a changing member to change a traveling direction of a light, the changing member including a lens and/or a diffractive optical element.

12. The laser welding apparatus according to claim 11, wherein the radiator is configured to alter the intensity distribution of the beam generated by the generator by altering the changing member.

13. The laser welding apparatus according to claim 8, wherein the laser welding apparatus is configured as a fiber laser.

14. The laser welding apparatus according to claim 10, further comprising:
  a generator configured to generate the beam by amplifying a light emitted by a laser medium,
  wherein the radiator sets an intensity distribution of the beam generated by the generator using a changing member to change a traveling direction of a light, the changing member including a lens and/or a diffractive optical element.

15. The laser welding apparatus according to claim 14, wherein the radiator is configured to alter the intensity distribution of the beam generated by the generator by altering the changing member.

16. The laser welding apparatus according to claim 10, wherein the laser welding apparatus is configured as a fiber laser.

* * * * *